United States Patent [19]

Zlotski

[11] Patent Number: 4,622,989

[45] Date of Patent: Nov. 18, 1986

[54] CHECK VALVE RETAINER

[75] Inventor: William J. Zlotski, Canyon Country, Calif.

[73] Assignee: HR Textron Inc., Valencia, Calif.

[21] Appl. No.: 775,900

[22] Filed: Sep. 13, 1985

[51] Int. Cl.[4] .................. F16K 43/00; F16K 15/04; F16K 51/00

[52] U.S. Cl. .................. 137/315; 137/539.5; 137/540; 137/454.2

[58] Field of Search .............. 137/315, 454.2, 454.5, 137/539, 539.5, 540, 540.11, 533.11, 542

[56] References Cited

U.S. PATENT DOCUMENTS

| | | | |
|---|---|---|---|
| 1,266,192 | 5/1918 | Anthony | 137/231 |
| 1,288,063 | 12/1918 | Lewis | 137/798 |
| 1,484,342 | 2/1924 | Schweinert | 137/231 |
| 1,799,433 | 4/1931 | Murphy | 137/798 |
| 1,807,564 | 5/1931 | Blinn | 137/539.5 |
| 1,876,355 | 9/1932 | Smith | 137/539.5 |
| 1,877,938 | 9/1932 | Moore | 137/539.5 |
| 2,018,455 | 10/1935 | Lofton | 403/47 |
| 2,784,737 | 3/1957 | Kelly | 137/540.11 |
| 2,810,397 | 10/1957 | Olson et al. | 137/540.11 |
| 2,840,108 | 6/1924 | Clymer | 137/565 |
| 2,994,280 | 8/1961 | Daffin | 166/133 |
| 3,247,862 | 4/1966 | Burke | 137/454.5 |
| 3,348,615 | 10/1967 | Adams | 137/539 |
| 3,369,741 | 2/1968 | Weggeman | 137/454.4 |
| 3,941,145 | 3/1976 | Morain et al. | 137/318 |
| 4,257,443 | 3/1981 | Turney | 137/454.2 |
| 4,284,261 | 8/1981 | Benjamin | 251/60 |

FOREIGN PATENT DOCUMENTS

| | | | |
|---|---|---|---|
| 915663 | 11/1963 | France | 137/539 |
| 487756 | 6/1938 | United Kingdom | 137/539 |
| 731028 | 6/1955 | United Kingdom | 137/540 |

Primary Examiner—George L. Walton
Attorney, Agent, or Firm—Nilsson, Robbins, Dalgarn, Berliner, Carson & Wurst

[57] ABSTRACT

A positive retainer for assuring maintenance of a desired position of a check valve within a flow path within a body. The retainer is a threaded member which engages threads internally disposed within a hollow plug used to secure a check valve in a non-threaded fashion within a bore within a body through which fluid is to flow. The threaded member includes means for permitting the liquid to flow in a substantially unimpeded manner.

4 Claims, 3 Drawing Figures

CHECK VALVE RETAINER

FIELD OF THE INVENTION

This invention relates generally to liquid flow apparatus and more specifically to a device for retaining a check valve within a body through which fluid flows.

BACKGROUND OF THE INVENTION

Check valves are utilized in all types of liquid flow circuits. The check valves take various forms. Many of them are threadably received within the flow circuit or may be maintained in position by appropriate fasteners. The present invention is directed to the type of check valve which is held in place within a bore formed within a body and held in place by an interference fit within the bore. Traditionally such check valves are further secured by the utilization of a hollow tapered pin which is forced into place and causes the body of the check valve to expand into a more secure interference fit with the bore formed in the body and within which the check valve is received.

Experience has, however, taught that when fluid is flowing through the check valve at relatively high pressures that upon the attempt of the fluid to reverse flow against the direction normally permitted by the check valve, high forces are generated which urge the check valve from its seated position. If such forces are great enough, the check valve can move and, in some instances, may even block the flow path for the fluid, thus creating a situation wherein the devices dependent upon the fluid flow cannot operate.

SUMMARY OF THE INVENTION

A retaining device for a check valve which is non-threadably received within a bore in a body and which includes a hollow tapered plug for seating the valve and having threads formed internally thereof, a retainer having a first end and external threads for threadably engaging the internal threads of the plug. The retainer may be sized lengthwise such that it fits snugly within the cavity between the end of the check valve and the inner surface of an external plug which seals the bore, thereby precluding significant movement of the check valve under conditions of high reverse pressures and/or pulsating pressures. The outer diameter of the external threads increasing along the length of the retainer from the end to thereby expand the plug as said retainer is threadably received therein. The retainer also defines a fluid flow path therethrough to permit freeflow of the fluid through the check valve.

DETAILED DESCRIPTION

Figure 1:
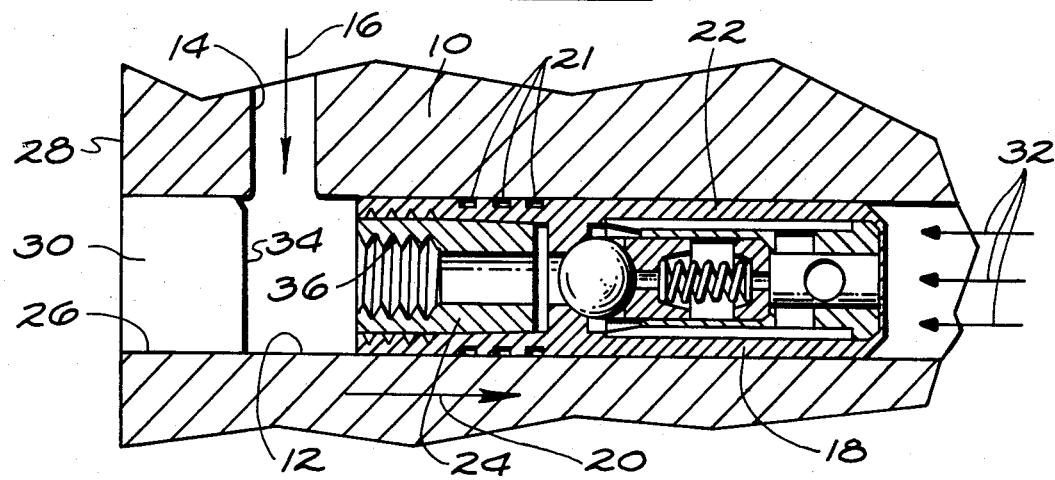
FIG. 1 is a schematic diagram in cross sectional form illustrating a check valve seated in accordance with the prior art.

As is shown in FIG. 1, a body 10 defines a bore 12 therein. The bore also includes an intersecting bore 14 through which fluid will flow as shown by the arrow 16. Seated within the bore 12 is a check valve 18 which permits the flow of liquid in the direction of the arrow 20 but precludes flow in the reverse direction.

Figure 2:
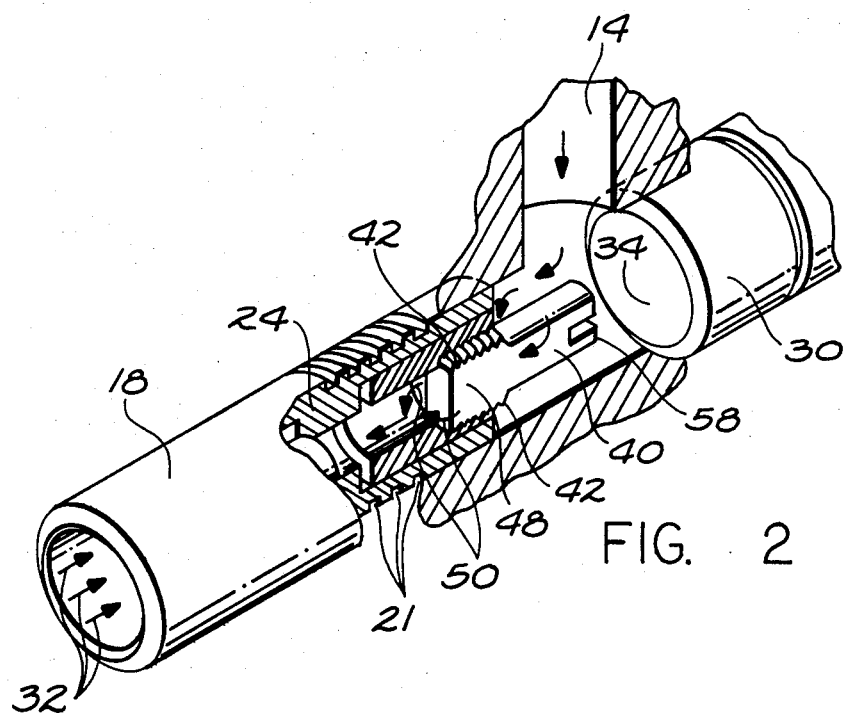
FIG. 2 is a perspective view, partially in cross section of a check valve incorporating the retainer of the present invention.

The check valve as is shown in FIG. 2 is well known to the art and is sold under the trademark "LEE CHECK" by The Lee Company of Westbrook, Conn. The check valve includes a housing 22 which is retained within the bore 12 by way of an interference fit therewith. Both the check valve 18 and the tapered plug 24 are inserted through the opening 26 formed in the surface 28 of the body 10. After the housing with the check valve included therein is positioned within the bore 12, tapered pin 24 is inserted within an opening at one end of the housing 22. This pin 24 is then forced into place to cause the outer surface of the housing 22 to expand and further form the interference fit with the bore 12. Both the check valve 18 and the tapered plug 24 are inserted through the opening 26 formed in the surface 28 of the body 10. After the check valve and the tapered pin are properly seated, and sealed by the forced expansion of the housing 22 through insertion of the pin 24, a plug 30 closes the opening 26 to the bore 12 thus permitting the flow of fluid as indicated by the arrows 16 through the check valve and through appropriate passageways formed in the body 10 to the desired apparatus utilizing the fluid under pressure. A plurality of grooves 21 formed about the housing 22 function as an added seal and lock for housing 22 in the bore 12.

The prior art device as shown in FIG. 1 functions well under normal circumstances. It has, however, been found that when a sufficient amount of force is applied as illustrated by the arrows 32, as a result of the check valve closing, the check valve housing 22 has been known to slip within the bore 12 and to move rearwardly until it seats against the inner surface 34 of the plug 30 and as will be noted, the flow path 14 is thereby closed preventing the flow of fluid.

Figure 3:
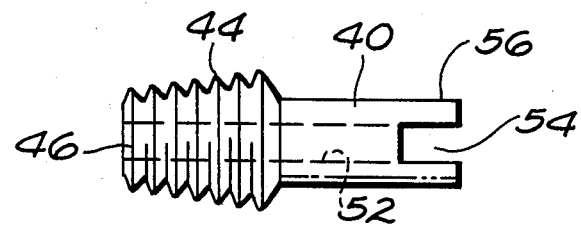
FIG. 3 is an elevational view of the retainer constructed in accordance with the present invention.

The positive retainer of the present invention which is utilized to preclude such reverse movement of the check valve 18 is illustrated in FIG. 2 to which reference is hereby made. The check valve 18 is identical to that shown in FIG. 1 as is the tapered pin 24 and the above description is hereby incorporated by reference. As is shown both in FIG. 1 and in FIG. 2, the tapered pin has threads 36 formed in its hollow internal section. These threads are normally used to receive a removal tool utilized to remove the tapered pin 24 which in turn allows removal of the check valve 18. However, in accordance with the present invention there is provided a retaining means 40 which includes threads 42 formed on the outer surface thereof and which will mate with the threads 36 formed in the tapered pin 24. As is shown both in FIG. 2 and more specifically in FIG. 3, the outer diameter of the threads as shown at 44 increase as the threads progress from the end 46 of the retainer 40. In this manner, as the retainer is threaded into place along the threads 36 of the tapered pin, the pin is caused to continuously expand outwardly and in turn forces the outer surface of the housing 22 to also further expand thus firmly and securely locking the check valve 18 in place within the bore 12 thus precluding any movement thereof.

As will be noted, the sides 48 of the retainer have been ground flat to thus permit the flow of fluid through the passageway 14 and the bore 12 and around the retainer 40 as shown by the arrows 50. The retainer may also include a central opening therethrough as depicted by the dashed lines 52 in FIG. 3 thus enhancing the flow path of the fluid under pressure by passing the retainer 40. An appropriate means for threading the retainer into the threads of the tapered plug is provided and may, for example, take the form of a kerf 54 although it will be recognized that the end 56 may be formed to receive a wrench, socket or other tool as may be desirable for appropriately seating the positive retainer.

The retainer 40 may be constructed in such a manner that a slight clearance is provided between the end 58 thereof and the surface 34 of the plug 30. Such clearance would permit some slight movement of the check valve and the retainer in the event extreme pressures are provided as illustrated by the arrows 32 tending to unseat the check valve. Under these conditions the end 58 of the retainer would contact the surface 34 of the plug 30 and preclude further movement even under the most severe conditions of reverse pressure even of a continually pulsating type. As a result, the fluid flow path would never be blocked by inadvertent movement of the check valve 18.

There has thus been disclosed a retainer mechanism which will positively seat and retain a check valve in an interference fit within a bore within a body irrespective of the pressures applied to the check valve.

What is claimed is:

1. In a check valve having a housing to be non-threadably received within a bore and having a hollow tapered plug force fitted within said housing to expand said housing for seating the valve within the bore the improvement for retaining the valve within the bore comprising:

threads formed internally of said hollow plug;

a retainer having a first and a second end and having external threads for threadedly engaging the internal threads of said plug, the outer diameter of said external threads increasing along said retainer away from said first end thereby to expand said plug and to further expand said housing to seat said plug in said bore as said retainer is threadedly received therein, said retainer defining a fluid flow bypass path to permit free flow of fluid through said check valve; and means on sid second end of said retainer for threadedly seating said retainer within said hollow plug.

2. The improvement as defined in claim 1 wherein said retainer is a retangularly shaped member with two sides of substantially smaller dimension than the inner diameter of said tapered plug to thereby provide said flow path.

3. The improvement as defined in claim 2 wherein said retainer further includes a through bore to further enhance said flow path.

4. The improvement as defined in claim 1 wherein said bore includes a closure member having a surface, said second end of said retainer being positioned adjacent said surface to perclude inadvertent dislodgement of said check valve while retaining free flow of fluid through said check valve.

* * * * *